United States Patent [19]

Cullen

[11] Patent Number: 5,490,648
[45] Date of Patent: Feb. 13, 1996

[54] MECHANICAL STABILIZER

[76] Inventor: Christopher P. Cullen, 400 Colonial Ave. #58, Ipswich, Mass. 01938

[21] Appl. No.: 73,135

[22] Filed: Jun. 7, 1993

[51] Int. Cl.$^6$ .................................................. F16M 11/24
[52] U.S. Cl. ........................... 248/188.3; 248/188.5
[58] Field of Search .......................... 248/188.2, 188.3, 248/188.5, 615, 616, 635, 188.8

[56] References Cited

U.S. PATENT DOCUMENTS

| | | | |
|---|---|---|---|
| 1,273,939 | 7/1918 | Sidel . | |
| 2,054,977 | 9/1936 | Herve | 248/188.3 |
| 2,055,715 | 9/1936 | Barker | 45/139 |
| 2,176,255 | 10/1939 | Frost | 45/139 |
| 2,204,077 | 6/1940 | Eriksson | 248/188.5 |
| 2,682,131 | 6/1954 | Matter | 45/139 |
| 2,683,576 | 7/1954 | Miller | 248/677 X |
| 2,775,849 | 1/1957 | Ingram | 45/139 |
| 2,795,892 | 6/1957 | Lautenbacher et al. | 45/139 |
| 2,956,368 | 10/1960 | Klein | 45/137 |
| 3,045,390 | 7/1962 | Tao | 248/188.3 |
| 3,144,234 | 8/1964 | Artmann | 248/188.2 |
| 3,191,895 | 6/1965 | Whelan | 248/19 |
| 3,215,382 | 11/1965 | Stein | 248/172 |
| 3,215,383 | 11/1965 | Wright | 248/188.3 |
| 3,480,247 | 11/1969 | Waner | 248/355 |
| 3,589,757 | 6/1971 | Mooney | 287/57 |
| 3,827,663 | 8/1974 | Hinman | 248/188.3 |
| 4,644,617 | 2/1987 | Tupper et al. | 24/611 |
| 4,658,124 | 4/1987 | Bertina | 248/188.2 X |
| 4,749,163 | 6/1988 | Mestdagh | 248/615 |
| 4,798,359 | 1/1989 | Ball | 248/188.3 |
| 4,830,320 | 5/1989 | Bellows | 248/188.2 |
| 5,007,503 | 4/1991 | Sturm | 182/202 |
| 5,042,764 | 8/1991 | Carpinella et al. | 248/188.2 |

FOREIGN PATENT DOCUMENTS

| | | | |
|---|---|---|---|
| 3620520 | 12/1987 | Germany | 248/188.3 |
| 394848 | 7/1933 | United Kingdom | 248/188.3 |

*Primary Examiner*—J. Franklin Foss
*Assistant Examiner*—Korie H. Chan
*Attorney, Agent, or Firm*—Fish & Richardson

[57] ABSTRACT

A bistable element enables control of an adjustable member, e.g. an adjustable leg, by selectively positioning an engaging element that can selectively prevent retraction. Preferably, the bistable element enables control in two regimes by positioning an engaging piece that can bear on the adjustable member. In one stable configuration, the bistable element enables a first regime, by positioning an engaging piece to frictionally bear upon the adjustable member to prevent retraction but enable free extension so that once the device is adjusted for a given support surface, the article is positively locked against tipping even if the load on the article is shifted. In another stable configuration, the bistable element enables a second regime by positioning the engaging piece such that the adjustable member is freely retractable and extendible so that the mechanism can be readjusted when the article is moved to a different surface.

24 Claims, 8 Drawing Sheets

MECHANICAL STABILIZER

FIELD OF THE INVENTION

This invention relates to mechanical positioners and stabilizers that can be used to position an article or stabilize an article.

BACKGROUND OF THE INVENTION

An article resting on irregular, uneven flooring tips as weight is shifted about its surface. This can be merely annoying when the article is a piece of furniture, such as a table or the like, or even dangerous in the case of scaffolds, machinery, ladders and so forth where instability could lead to injury. Over the years, devices to stabilize articles have been proposed, most of which involve adjustable legs or shims that compensate for unevenness.

Nevertheless, instability remains a common problem.

SUMMARY OF THE INVENTION

An object of the invention is a relatively simple, reliable device for positioning or stabilizing articles, such as furniture, which are on an uneven support surface. It has been discovered that a bistable element can be conveniently and easily employed to enable controlled extension and retraction of an adjustable member, for example, an adjustable leg, that compensates for unevenness. A "bistable element" as used herein refers to a member that can be positioned in at least two configurations in which the element is stable at rest and is not biased or otherwise tending to another configuration. A preferred example, discussed in detail below, is an invertable spring washer element that can be positioned in two stable conical configurations by inverting the element through unstable configurations in which the element tends to one or the other of the stable conical configurations by virtue of its internal elastic spring forces. To switch the bistable element between stable configurations, force must be applied sufficient to overcome the spring forces. In preferred embodiments of the invention, such a bistable element enables control of an extendable member by selectively positioning an engaging piece that can selectively prevent retraction of the adjustable member. Preferably, the bistable element enables control in two regimes by positioning an engaging piece that can bear on the adjustable member. In one stable configuration, the bistable element enables a first regime by positioning an engaging piece to frictionally bear upon the adjustable member to prevent retraction, but enables free extension so that once the device is adjusted for a given support surface, the article is positively locked against tipping even if the load on the article is shifted. In another stable configuration, the bistable element enables a second regime by positioning the engaging piece such that the adjustable member is freely retractable and extendable so that the device can be readjusted when the article is moved to a different surface. The invention employing the bistable member enables effective, yet simple embodiments which have further advantages such as reliability and ease of manufacturability; many of the components can be formed in a single molded piece.

In a particular aspect, the invention features a device for positioning an article. The device includes a unit with first and second members adapted for relative movement such that the first member is selectively moveable along an axis for controllably extending and retracting the first member with respect to the second member within first and second regimes. The first regime allows free extension of the first member relative to the second member while locking the first member against retraction. The second regime allows the first member to be reversibly extended and retracted. The device includes a coupling mechanism for enabling the regimes. The coupling mechanism includes a bistable element and an engaging piece disposed about the axis of motion of the first member which are cooperatively constructed such that the bistable element in one configuration enables the first regime by positioning the engaging piece to prevent retraction of first member but enables free extension of first member. In another configuration, the bistable element enables the second regime by positioning the engaging piece such that the first member is freely retractable and extendable. A regime control allows switching between the first and the second regimes by changing the configuration of the bistable member.

Embodiments may include one or more of the following features. The coupling mechanism includes a cam surface disposed about and transverse to the axis of motion and the bistable element enables the first regime by positioning the engaging piece adjacent the cam surface and first member such that the engaging piece frictionally bears upon the cam surface and first member to prevent retraction of the first member but enables free continuous extension of the first member, and in another configuration, the bistable element enables the second regime by positioning the engaging piece relative to the cam surface such that the first member is freely retractable and extendable. The bistable member is an invertable member having mirror-image stable configurations. The bistable element is an annular spring-washer element having inverted conical stable configurations. An outer radial edge portion of the bistable element is axially stationary and an inner radial edge portion is axially translated with respect to one of the first and second members when switching between configurations. The engaging piece is a spherical element, and, preferably, the device includes a plurality of the engaging pieces disposed around the axis and a retaining member also disposed around the axis for maintaining the circumferential separation of the engaging pieces. The regime control is a switching element associated with the first member, the switching element positioned about the axis of motion to cause automatic switching of the bistable member between stable configurations at a selected desired point of retraction and at a desired point of extension of the first member. The switching element includes a first tab positioned on the first member to apply a force to the bistable element to enable the first regime at maximum retraction of the first member and a second tab positioned on the first member to apply a force to the bistable element to enable the second regime at a maximum extension of the first member. The first member is a shaft member and the second member is a housing adapted to receive an upper portion of the shaft member. The upper portion of the shaft member includes a taper to smaller cross-sectional dimension in the direction of lower portions. The taper is such that a clearance is maintained between the shaft and lower portions of the housing member when the shaft member is positioned off-axis with respect to the housing member at the maximum angle permitted by the dimension and orientation of the engaging member and cam surface. The device includes a spring biasing the first member to extended positions and the device is constructed such that the bias force of the spring is greater than the force needed to switch the bistable element from one to another stable configuration. The device is constructed such that the weight of the article is sufficient to overcome the bias force of the spring and the force needed to switch the bistable element. The first member is a shaft member including a base at one end for contacting the uneven surface and the second member is a housing constructed for mounting in the leg of the furniture. The device is constructed for positioning adjacent the furniture as an adjustable shim. The device is free-standing, without permanent attachment to the furniture, including a first member, adapted as a housing member having a portion for interposing between the furniture and the uneven surface and the second member is an adjustable leg member including a base at one end for contacting the surface. The first, moveable member is the supporting leg of an article. The bistable element and retainer member are a single molded piece.

In a particular aspect, the invention features a device for stabilizing an article on a surface. The device includes a supporting unit with a first member in the form of a moveable shaft and a second member in the form of a housing for receiving the shaft. The shaft is moveable along an axis for controllably extending and retracting the first member with respect to the second member within first and second regimes. The first regime allows free extension of the first member relative to the second member while locking the first member against retraction and the second regime allows the first member to be reversibly, freely extended and retracted. A coupling mechanism automatically enables the regimes. The coupling mechanism includes an invertable bistable element associated with the second member, which is an annular invertable spring where outer radial edge portions of the spring are axially stationary and inner radial edge portions are axially translated in use. A rotatable engaging piece is disposed about the axis of motion of the first member. A cam surface is disposed about and transverse to the axis of motion. The bistable element enables the first regime by positioning the engaging piece adjacent the cam surface and first member such that the engaging piece frictionally bears upon the cam surface and first member to prevent retraction of the first member but enables free, continuous extension of the first member. In another, inverted configuration, the bistable element enables the second regime by positioning the engaging piece relative to the cam surface such that the first member is freely retractable and extendable. A regime control is associated with the first member for controllably and automatically switching between the first and the second regimes by inverting the bistable member at a desired point based on the extension or retraction of the first member.

An upper portion of the shaft member may include a taper to smaller cross-sectional dimension in the direction of lower portions. A spring may bias the first member to extended positions. The spring is constructed to have a bias force greater than the force needed to switch the bistable element from one to another stable configuration.

The invention also features an article having a series of supporting legs wherein each of the legs includes a device according to the invention. The invention also includes methods for manufacture and use of the devices described. For example, still other aspects of the invention will be understood from the following description and from the claims.

DESCRIPTION OF THE PREFERRED EMBODIMENTS

We first briefly describe the drawings.

DRAWINGS

DESCRIPTION AND OPERATION

Figure 1:
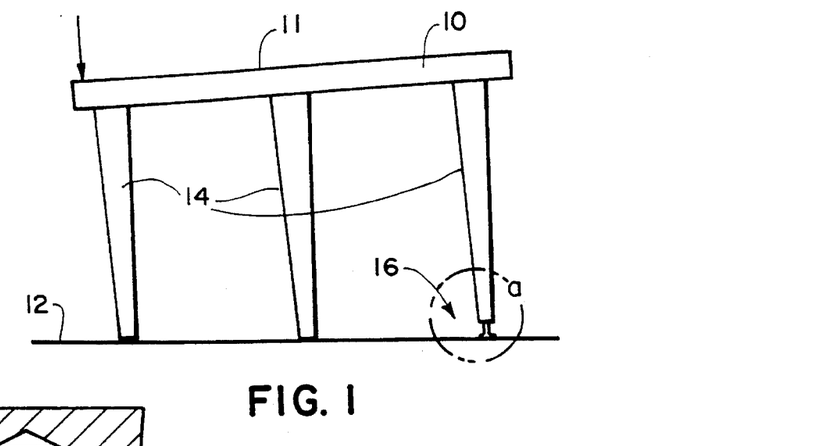
FIG. 1 is a side-view of a table according to the invention stabilized on an uneven support surface.
Figure 2:
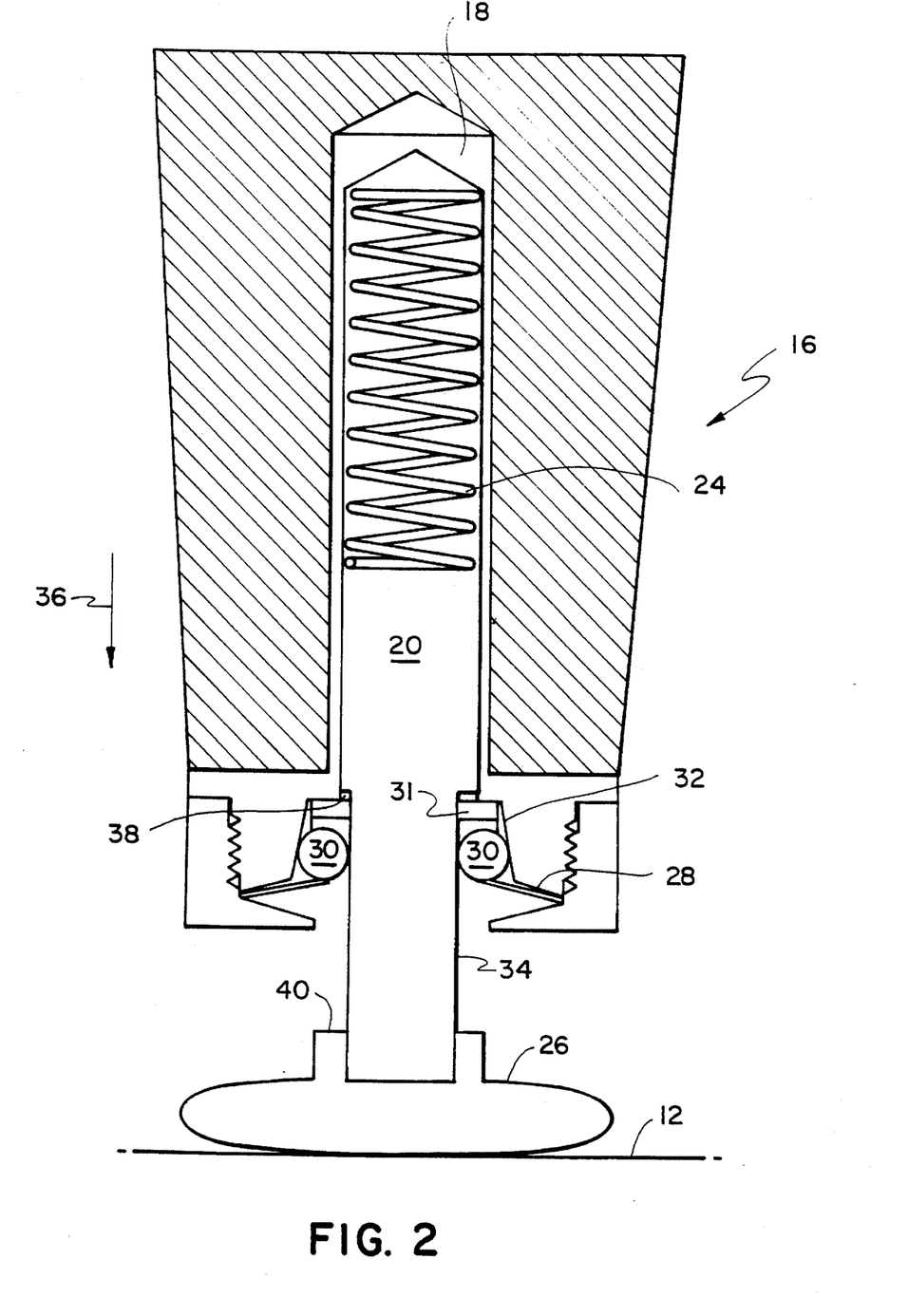
FIG. 2 is an enlarged view of the area in circle 'a' in FIG. 1, showing, in cross-section, one of the legs of the table, which is equipped with a stabilizing device of the invention.
Figure 2A:
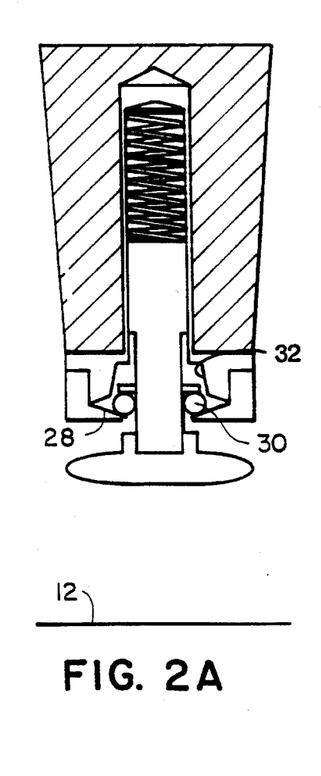
FIGS. 2A–2C are further cross-sectional views illustrating the operation in and switching between different regimes.
Figures 2B, 2C:
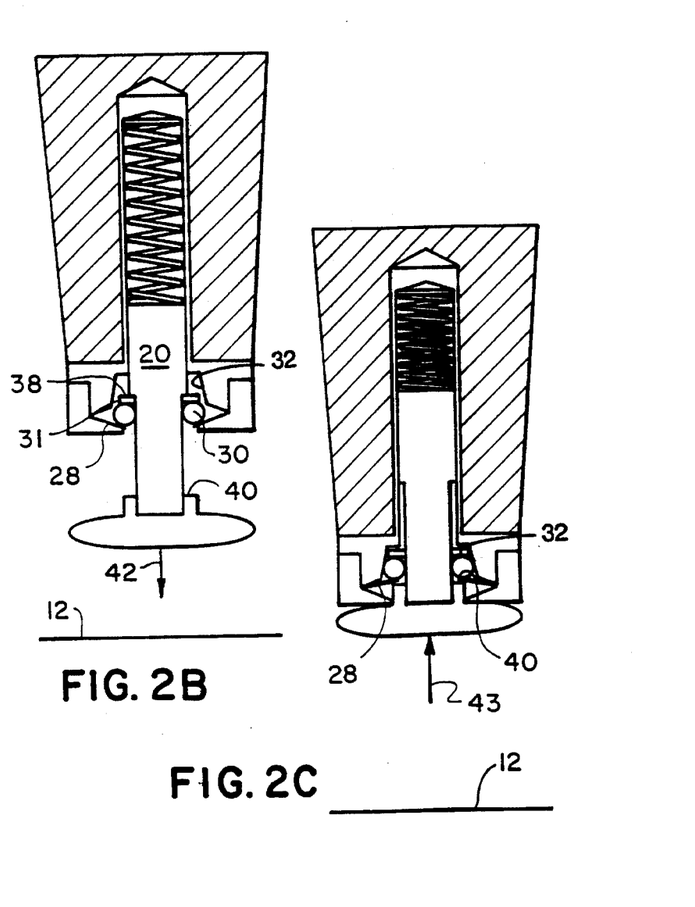

Referring to FIGS. 1 and 2–2C, particularly to FIGS. 1 and 2, an embodiment of the invention features an adjustable leg device 16 for stabilizing a piece of furniture such as a table 10 supported by legs 14 on an uneven support surface 12. The device 16 is fitted into the bottom portion of the table leg 14 and includes a housing 18 for a moveable, adjustable shaft member 20, which can be extended and retracted along an axis 22 to compensate for the unevenness of the surface 12 and thus prohibit rocking as weight is shifted about the surface 11 of the table. The shaft 20 is biased by a spring 24 to extend from the housing 18 and includes at one end a foot member 26 which contacts the surface 12.

The shaft and the housing are coupled by a mechanism including an invertable, annular bistable conical element 28, which positions engaging pieces 30 relative to a cam surface 32, and a lower portion 34 of shaft 20. The stable configurations of the bistable element enable regimes in which the extension and retraction of the shaft are controlled.

In a first regime, the bistable element enables continuous ratcheting extension of the shaft 20, i.e., the shaft is freely, continuously extendable to allow the shaft to compensate for unevenness, but retraction is prevented to maintain stability once the shaft is adjusted. Referring to FIG. 2, the bistable element 28 enables this first regime when in a first stable conical configuration in which the shape of cone widens toward the support surface 12. The bistable element provides a dual function in that it is configured to properly position the engaging pieces 30 adjacent the cam surface 32 and to provide a spring force that maintains the engaging piece in this position. Thus, with the engaging piece 30 adjacent the cam surface 32, force which would normally cause retraction of the shaft 20 (e.g., force in the direction (arrow 36) of the support surface 12), instead increases frictional engagement or jamming of the bearing 30 on the shaft portion 34 and the cam surface 32 to effectively lock the shaft 20 against further retraction into the housing 18 and therefore stabilize table 10. Yet, the shaft 20 can be freely extended from the housing (by removing force in the direction of the support surface) by, for example, lifting the portion of the table adjacent the leg to allow the spring 24 to bias the leg outwardly. During extension, the jamming or frictional forces on the wall portion 34 of the shaft and cam surface 32 are relieved when the engaging piece 30 travels a small distance (within the elastic limits of the bistable member in the first stable configuration) so that they are adjacent portions of the cam surface which are at larger radial distances from the axis 22 and do not contact the shaft with significant force. A slight rotation of the engaging piece might also release friction, enhancing smooth extension of the shaft.

In the second regime, the bistable element enables non-ratcheting or free retraction of the shaft. Referring to FIG. 2A, in this regime, the bistable element 28 is inverted to a stable conical configuration in which the shape of the cone narrows toward the support surface 12. The engaging pieces 30 are thus positioned below the cam surface 32 so that engaging pieces 30 do not frictionally engage the cam surface 32 and shaft portion 34.

Inversion of the bistable member 28, and thus switching between the regimes, is achieved automatically at a desired extension or retraction of the shaft 20. Referring particularly to FIGS. 2 and 2B. Shaft 20 includes a ledge or shoulder 38 which, at a selected extension of the shaft 20, engages a retainer 31 (used to keep multiple engaging piece circumferentially equidistant, as discussed further below) which engages the engaging pieces 30, which in turn engage the bistable element 28. The bias force supplied by the spring 24 is sufficient to overcome the internal elastic spring force of the bistable member so that upon full extension (arrow 42) of the shaft, the bistable element is inverted to the second stable position to position the engaging pieces 30 below and away from the cam surface 32, thus allowing free retraction of the shaft 20 into the housing 18.

Referring to FIG. 2C, shaft 20 further includes a ledge or shoulder 40 that engages the bistable member 28 when the shaft 20 is retracted to a desired degree. Full retraction (arrow 43), overcoming the force of spring 24 and the bistable element, inverts the bistable element to the first stable position to again position the engaging pieces 30 adjacent the cam surface 32 and therefore reenable the ratcheting extension regime. The spring 24 is preferably fully compressable by the weight of the article on which the device is provided so that inversion of the bistable element to enable the ratchet extension regime is achieved by simply placing the article on a surface.

Figure 3:
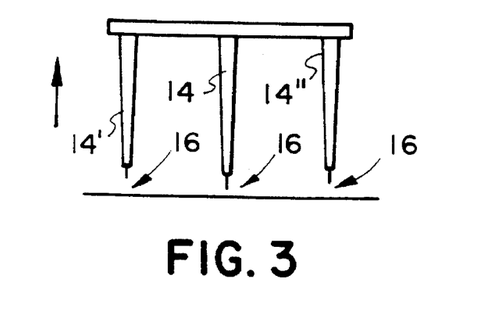
FIGS. 3–3D illustrate use of the device to stabilize and level an article.
Figure 3A:
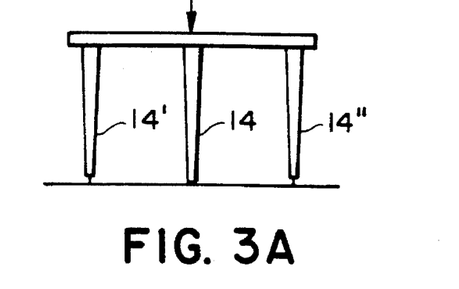
Figure 3B:
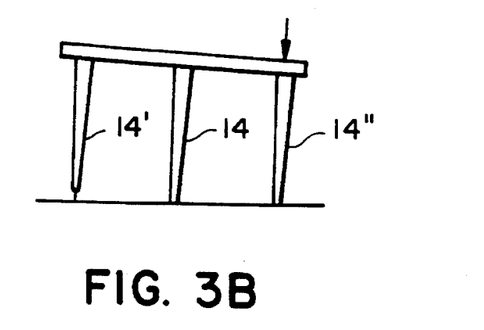
Figure 3C:
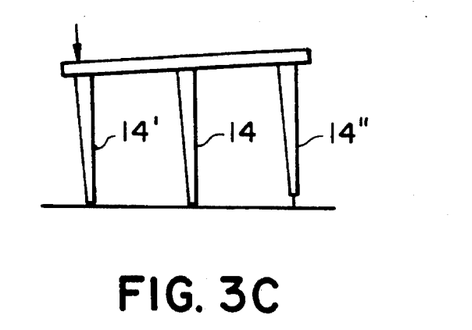
Figure 3D:
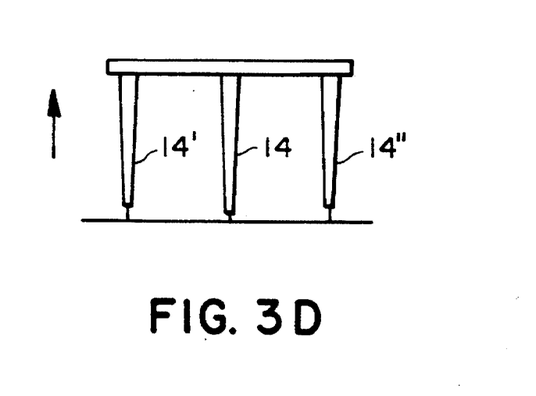

Referring to FIGS. 3–3D, in use, each leg of an article of furniture may include an adjustable leg device 16 to stabilize the furniture, such as in the case where two opposing table legs 14' and 14" are shorter than the other two legs 14 (shown schematically by a single center leg 14). (Of course, the invention is applicable to situations where the legs of an article are uneven as well as cases where the flooring is uneven, e.g., FIG. 1). The article 10 is first lifted from the floor so that all the adjustable devices extend fully, which releases the ratcheting extension regime and enables the free retraction regime (FIG. 3). Next, the article 10 is placed on the floor such that legs 14, which can evenly touch the floor do so, placing the adjustable devices for legs 14 in full retraction, thus enabling the ratcheting extension regime (FIG. 3A). The article is then rocked to one side, fully retracting the adjustable device on leg 14" to enable the ratcheting extension regime for that leg (FIG. 3B). The article is then rocked to the other side to enable the ratcheting extension regime for the device on leg 14" and, since the device on opposing leg 14" is in the ratcheting extension regime, it can only extend, and the article is stabilized (FIG. 3C). The stabilized table can be leveled by lifting the side of the table over leg 14' which causes the adjustable device for leg 14', now in ratcheting extension regime, to extend a desired amount so that the table is level and stabilized (FIG. 3D). The levelling feature can be used to align two tables so that their edges meet. Often in restaurants two or more tables are placed adjacent to each other to seat a large party. The table edges often do not meet properly, forming edges which interfere with placing and sliding dishes. The devices can be used to first stabilize the tables, and then align the tops to eliminate the edges.

DETAILED DESCRIPTION

Figure 4:
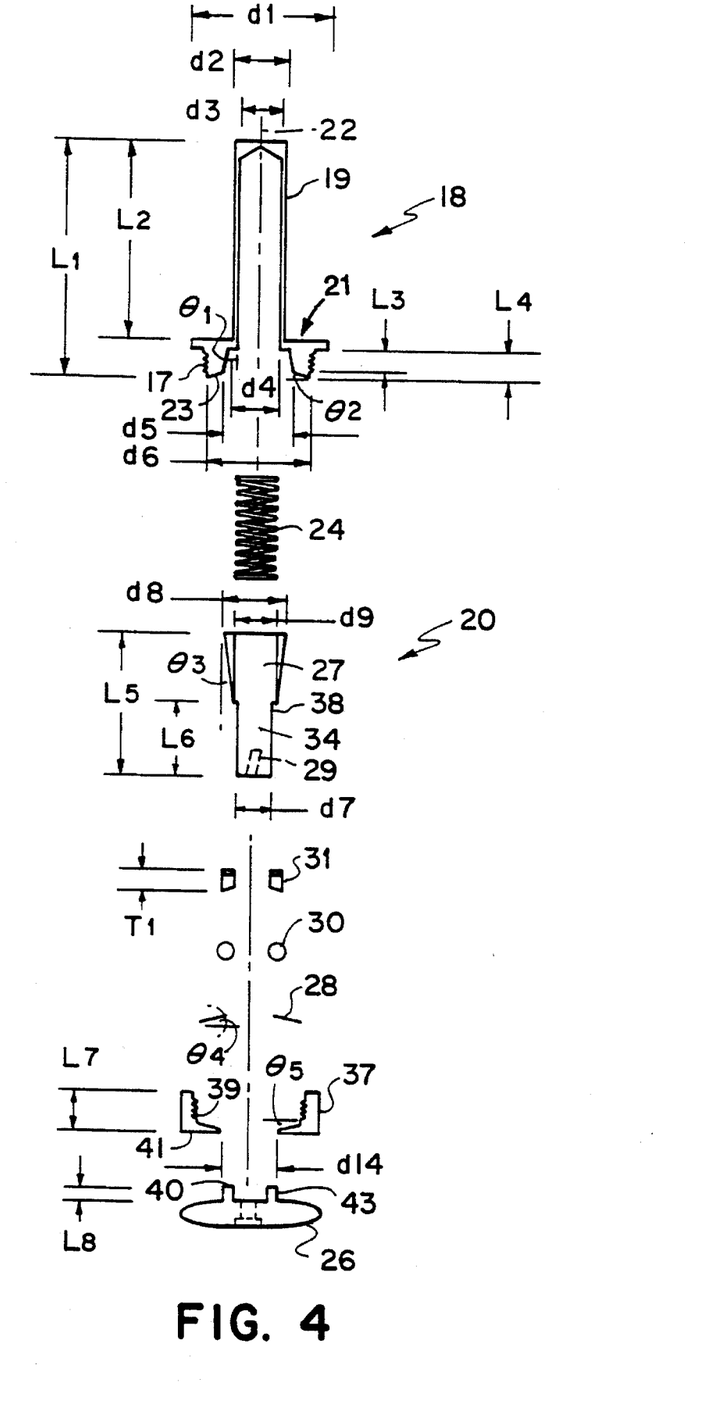
FIG. 4 is an exploded view of an embodiment of the stabilizing device illustrated in FIGS. 1 et seq.
Figure 4A:
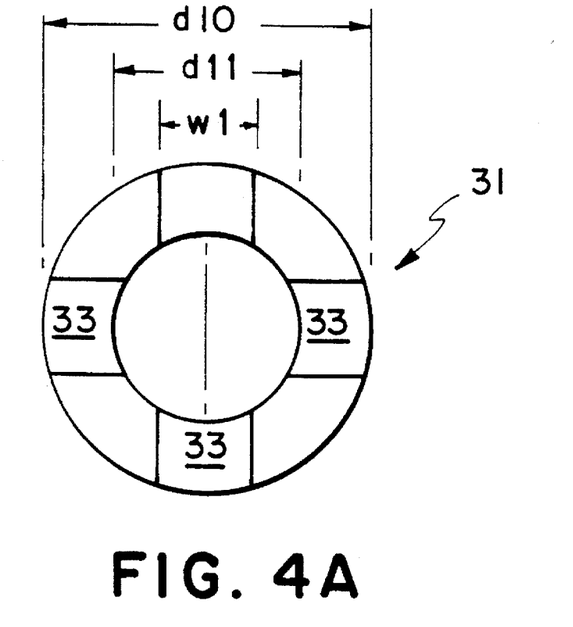
FIG. 4A is an end on view of a retainer.
Figure 4B:
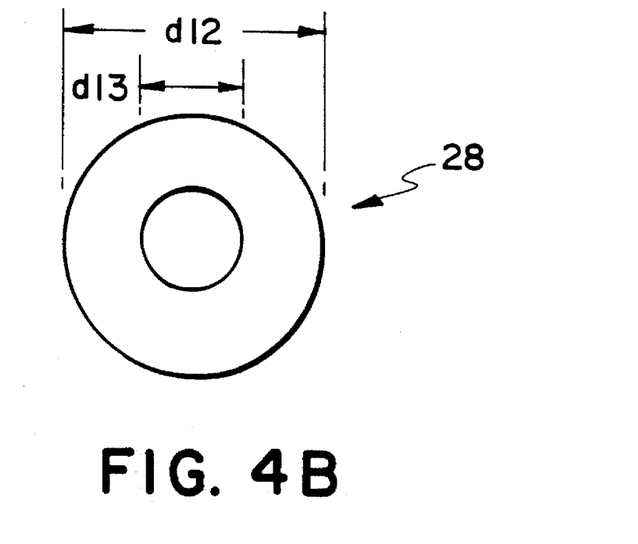
FIG. 4B is an end on view of a bistable spring washer member.

Referring to FIGS. 4–4B, an embodiment of the adjustable device 16 includes a body 18, e.g., stainless steel, of overall length $L_1$, about 1.74 inches and maximum outer diameter, $d_1$, about 1 inch (generally selected to correspond to less than the width of the end of the table leg into which the device is to be inserted). A portion 19 of the housing which is adapted to receive the shaft 20 has a length $L_2$, about 1.46 inches, and an outer diameter, $d_2$, of about 0.37 inch. The inner diameter, $d_3$, of the shaft portion 19 is about 0.32 inch. The housing 18 also includes a coupling portion 21 which provides annular cam 32 with a surface at an angle, $\theta_1$, about 10° extending over a length, $L_3$, about 0.2 inch to an outer diameter, $d_4$, about 0.55 inch. A taper 23 extends at angle, $\theta_2$, about 15°, to an outer diameter, $d_6$, about 0.75 inch. The taper 23 provides a reinforcing surface for an outer radial portion the bistable member 28 when the bistable member is deflected upward, enabling the ratcheting extension regime (see FIG. 1A). Coupling portion 21 also includes a thread (32 tpi thread) on the outside of the body for attachment of a housing retainer 37.

Spring 24 may be formed of 0.024 inch music wire at about 13.5 turns per inch formed on a 0.204 inch mandrel, applied with a full compression set. The free length of the spring is about 1.56 inches over which the spring has about 15 turns. The outer diameter of the spring is about 0.309 inch (23% spring back) with a final pitch of 0.104 inch (29% spring back). The spring, as discussed above, may be of a selected bias force. Preferably the spring force is sufficient to overcome the force needed to invert the bistable element but is not so stiff as to prevent full retraction (in the free retraction regime) when the article to which the device is attached is placed on the support surface. In the embodiment described, the spring is easily compressed when attached to a table weighing 10 pounds.

The shaft 20, e.g., stainless steel, has an overall length of $L_5$, about 1.160 inches, and is composed of lower portion 34 of length $L_6$, about 0.660 inch, and diameter $d_7$, about 0.25 inch, and an upper portion 27 which includes a taper from $d_8$, about 0.312 inch, to $d_9$ about 0.287 inch, with taper angle $\theta_3$, about 1.4°. (In this particular embodiment the device 16 can extend the shaft 20 over a distance of 0.5 inch before enabling the free extension/retraction regime.) The upper portion of the shaft terminates in ledge 38 which is about 0.020 inch wide. The lower portion 34 of the shaft includes at its end a drill and tapped hole 29, (tap 8–32 by 0.40 inch deep) for attachment of the foot member 26.

Figure 5:
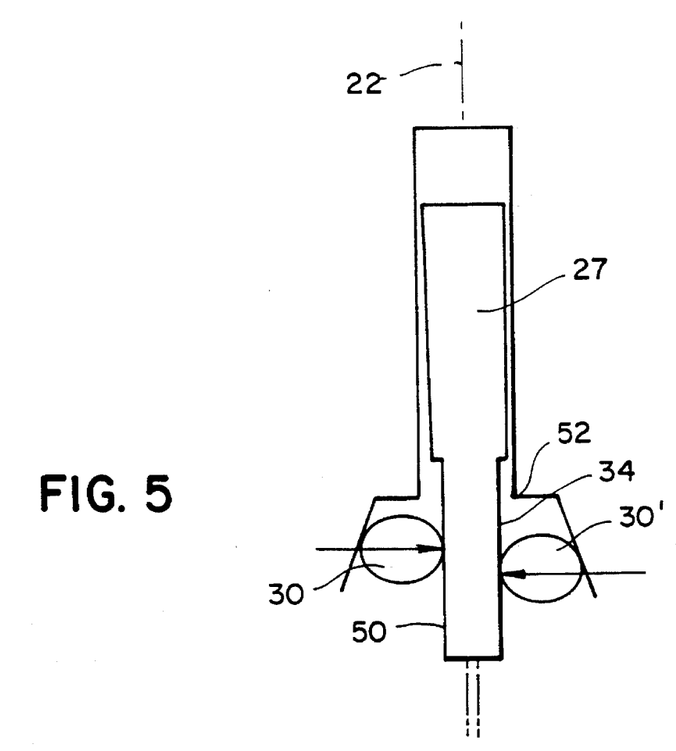
FIG. 5 illustrates an aspect of the invention.

The taper on the upper portion 27 of the shaft 20 is a particular aspect of the invention that can inhibit undesirable jamming of the shaft 20 during free retraction. In use, typically all of the engaging pieces 30 are at the same height, so that when the shaft is retracted, any side force of the shaft is opposed by the engaging members, which contact both the shaft portion 34 and the slanted cam surface 32. However, as illustrated in FIG. 5, if an engaging piece 30' should fall below the position on the cam surface where it cannot evenly oppose a side force 50, the shaft becomes oriented slightly off the axis 22. The taper of the upper portion 27 of the shaft provides a clearance that prevents contact of the lower shaft portion 34 with the lower region 52 of the housing portion 19, to avoid friction between the housing and shaft, which inhibits retraction. With the taper as described, the shaft has some angular play so that the shaft can continue retraction even with some of the engaging pieces axially mispositioned. The lower end of the shaft bears on the engaging pieces which can also rotate slightly to relieve off-axis jamming.

Referring back to FIGS. 4 and 4A, the device includes a bearing retainer 31 which is an annular ring, e.g., of brass, including a series of equidistantly spaced circumferential cut-out chamber portions 33. The retainer maintains the multiple engaging pieces at equidistant circumferential positions and helps to maintain axial positions about the shaft 20. The retainer 31 has a thickness $T_1$, about 0.15 inch, an outer diameter $d_{10}$, about 0.438 inch and an inner diameter $d_{11}$, about 0.266 inch. Each chamber 33 has a width, $w_1$, of approximately 0.13 inch to accommodate the engaging piece. The chambers are provided with a bevelled edge of about 15°, so that the bottom surface of retainer matches the form of the inverted member to allow maximum depth of the retainer and minimize the chance that an engaging piece will escape from its chamber. The depth of the retainer and size of the engaging piece is such that the lower portion of the retainer does not contact the bistable element. Rather, as leg 38 presses on the retainer 31, the retainer presses on the engaging pieces which contact the bistable element which applies even force to invert the element from the ratching to non-ratching extension regimes when the shaft 20 is fully extended. The engaging pieces 30, preferably steel spherical members, are about 1/8" in diameter.

The bistable element 28, polycarbonate (Lexan®), is an annular invertable spring member resembling a Belleville spring and having a cone angle, $\theta_4$, about 12°, an outer diameter, $d_{12}$, about 0.745 inch, an inner diameter, $d_{13}$, about 0.350 inch, and a thickness of about 0.010 inch. When the bistable element is forced out of one of the stable conical configurations it tends to spring to a stable configuration when the force is removed. The spring loaded element is believed particularly advantageous since, e.g., without plastic deformation, wear life will be substantially increased, uniformity of the stable configurations is increased and further, the force required to reconfigure the element may be reduced. For these preferred embodiments, the element can be formed of any material with sufficient elastic character to allow deformation through nonstable configurations without substantial plastic yielding. A plastic with less creep than Lexan may be used.

Housing retainer 37 retains components of the device within the housing 18 and includes an inner threading 39 which is matched to threading 17 of the lower portion 21 of the housing 18. The retainer is of length, $L_7$, about 0.293 inch. The inner diameter, $d_{14}$, is about 0.412 inch. The retainer also includes a reinforcing portion 41 which reinforces and supports the bistable member when positioned downward, enabling the free retraction regime. The portion 41 has an angle, $\theta_5$, of about 15°.

The foot member 26 includes a drilled tapped hole 43 through which a screw (8–32 flathead) can be threaded to secure the foot 26 to the hole 29 in leg 20. The foot also includes ledge member 40 for inverting the bistable element when the leg is fully retracted within the body. The ledge 40 has a length of $L_8$ about 0.110 inch and a contacting surface 43 of about 0.07 inch in width.

OTHER EMBODIMENTS

Figure 6:
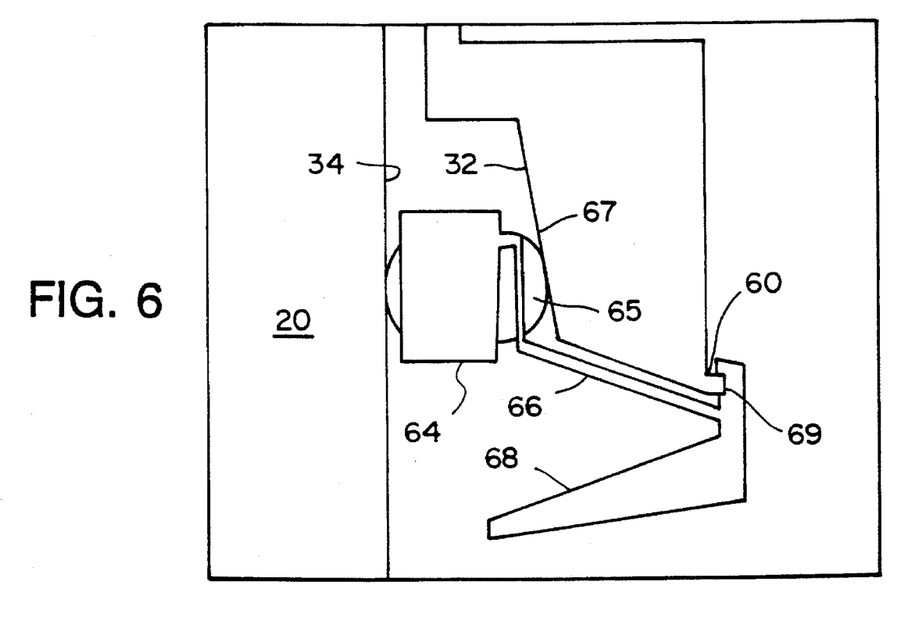
FIG. 6 is an enlarged cross-sectional view of a portion of another embodiment of the invention.

It will be understood that the mechanism as described here can take on various configurations for various purposes. Referring now to FIG. 6, an enlarged cross-sectional view of a coupling portion of a device, another embodiment is shown wherein a retainer 64, bistable element 66 and housing retainer 68 are of one molded piece. They are molded around stamped engaging elements 65, which have curved ends 67 to engage the shaft portion 34 and cam 32, and are ovoid in section and flat (stamped from metal sheet) in the other section. The molded piece has an external cavity 69 which snaps onto a mating flange 60, eliminating the need for any assembly fasteners. The device may also be made of a plastic, molded around the shaft, with integral ledge member. The plastic can have one of many common surface treatments for furniture glides, such as chrome plating. In this embodiment, wherein major portions of the device are molded in a single step, manufacturing costs can be significantly reduced.

Figure 7:
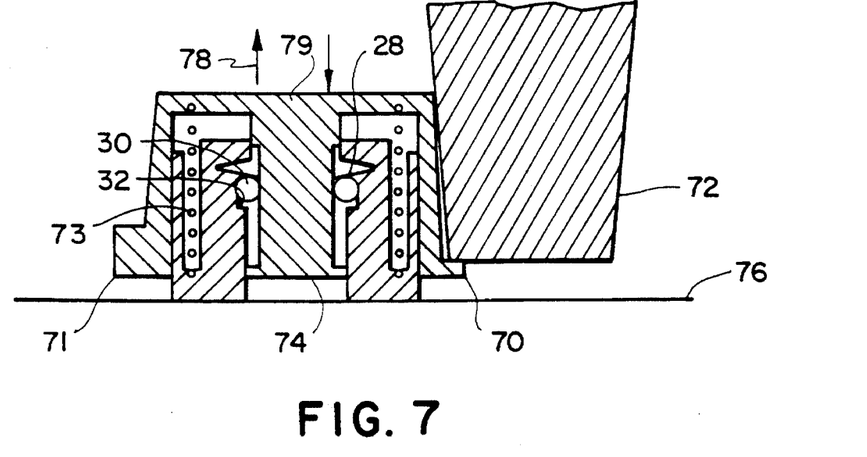
FIG. 7 is a cross-sectional view of another embodiment of the invention.

Referring now to FIG. 7, in another embodiment, a mechanism is utilized as an adjustable shim positioned next to the article to be stabilized. The device includes lateral extensions 70, 71 on which a leg 72 of the article can be placed. A shaft part 74 moves as discussed above, but the ratcheting extension direction and bias of the spring 73 is up (arrow 78) rather than down. The extensions 70, 71 fit under different size gaps between leg 72 and floor 76. For larger gaps the entire device can be placed under the leg. A particular advantage of this embodiment is that the article leg 72 of the article need not be modified to effect stabilization. The devices of the invention can be made quite small so that, rather than being positioned next to the leg as shown in FIG. 7, the device is positioned underneath the leg, which can rest on an upper surface 79 of the device. The bias spring in this embodiment does not occupy substantial vertical space above the range of motion. The continuous ratcheting extension of embodiments of the invention enables very small extensions to compensate for small irregularities in flooring using a small device.

Figure 8:
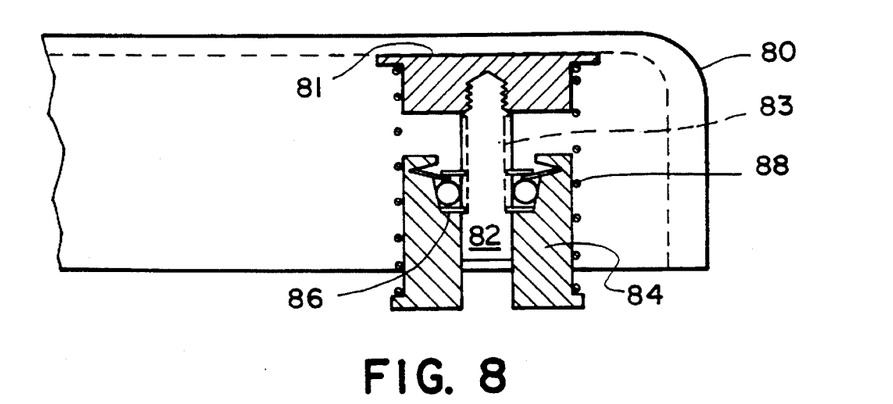
FIG. 8 and 8A are cross-sectional views of yet another embodiment of the invention.
Figure 8A:
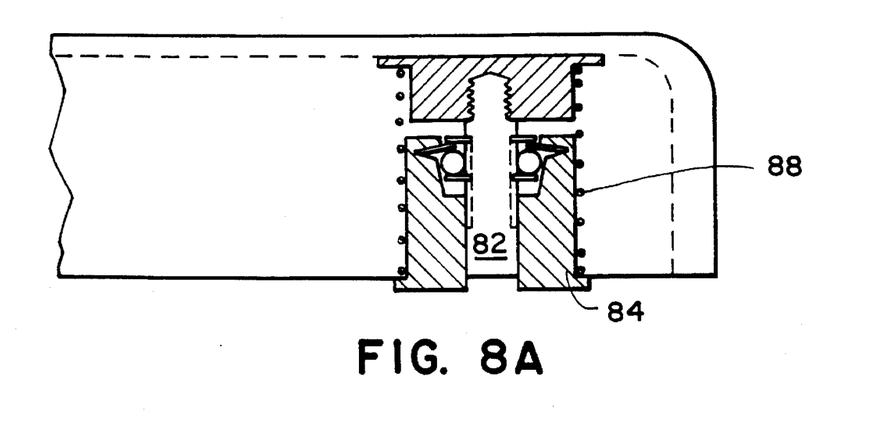

Referring to FIGS. 8 (ratchet extension) and 8A (free retraction), in another embodiment, a device has a top 81 attached to an article leg 80 by means of tacks, adhesive, or other means. The mechanism is a kinematic inversion of the device in FIG. 7, whereby a shaft 82 is stationary (attached to the leg), and the housing 84 and retaining mechanism 86 travel up and down in a cutout 83 in the leg. A bias spring 88 is arranged around the outside of the body so as to not occupy the vertical space above the range of motion. One advantage of this design is that it achieves a small device height, so as to fit under the article legs. In an embodiment, a device has minimum height (fully retracted) is 0.76 inch, diameter 0.95 inch, and about 0.25 inch of extension travel. The shaft could be an integral part of the furniture leg. This embodiment may be particularly suitable for use in attaching to pedestal tables commonly used in restaurants.

Figure 9:
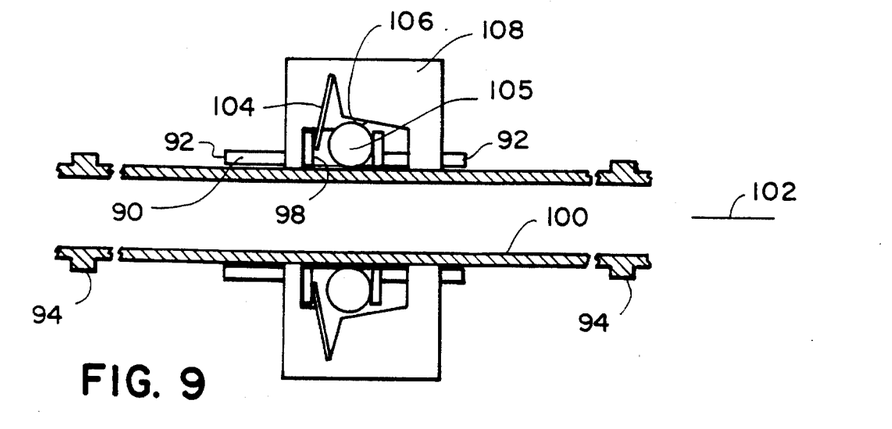
FIGS. 9–9A are cross-sectional views and FIG. 9B is a component view of another embodiment of the invention.
Figure 9A:
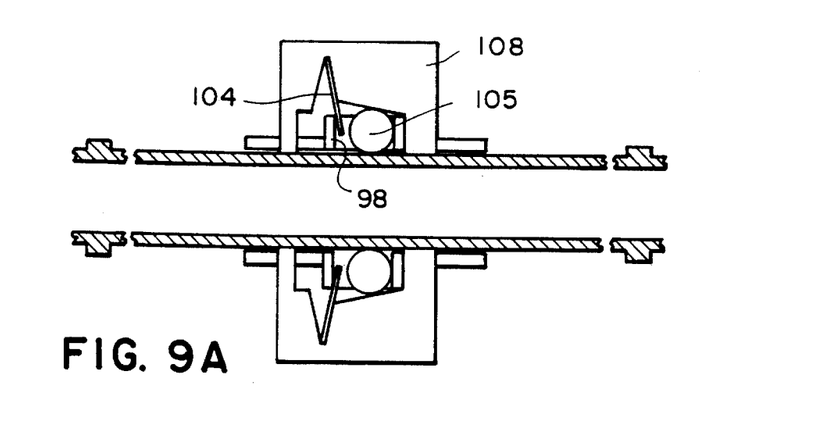
Figure 9B:
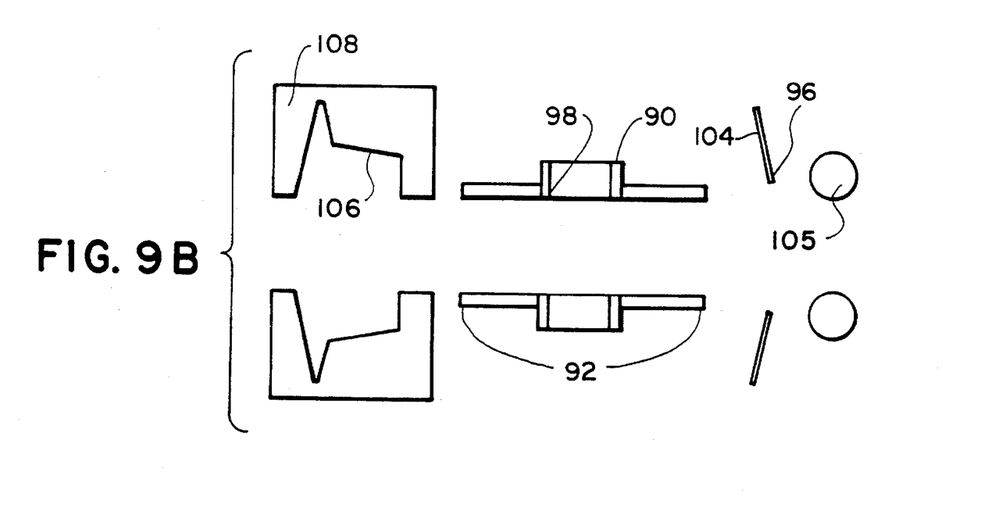

Referring to FIGS. 9 and 9A (cross-section) and 9B (assembly), an embodiment that provides general two-regime positioning along an arbitrary shaft 100 along an axis 102, using a spring-form bistable element mechanism 104 is shown. In FIG. 9, a free travel regime is illustrated. In FIG. 9A, a ratcheting extension is illustrated. The mechanism includes a bistable element 104, intervening members 105, and a retainer 90 with ends 92 that are engaged by features 94 to effect regime switching. A cam surface 106 is provided in a housing 108. The inner edge of bistable element 104 is captured between ledge 98 and intervening members 105 to effectively retain the members at the element's current bistable position. In this embodiment, the moveable shaft portion need not be spring biased. This embodiment is particularly useful for positioning desktops and ship hatches at a desired angle, levelling ladder legs and tripods, making a self-adjusting clamp, etc.

Many other modifications are possible. For example, many variations in dimension and material are possible. The spring force may be much lighter. While the embodiments shown illustrate a device (shaft, etc.) of generally circular cross-section, other geometric configurations are possible. Rather than a conical bistable element, another form of element could be used wherein the element has a spring-like behavior, tending to one of only two stable configurations. Such an element might not be circularly symmetric, and a separate such element might be used at each location that a jamming engaging piece element is positioned, for example, to effect a planar, rectangular, or other configuration of ratchet elements. The conical element used in the preferred embodiment is believed particularly advantageous for its economy of material used and simplicity of form, hence enhancing its cost of manufacture. The engaging piece, while illustrated as a separate spherical ball bearing can take other forms, such a rotatable cylinder, or may be a contiguous portion of the bistable element. Retainer 31 could be modified to include radially extending ramp surfaces that guide the engaging members away from the shaft axis to further limit friction in the free retraction regime. Such a retainer would thus position the engaging members both axially and radially. Embodiments may be configured in which the leg of a table is the moveable member and is directly contacted by the engaging pieces to control extension and retraction.

Still other embodiments are in the following claims.

What is claimed is:

1. A device for stabilizing an article, comprising:

a unit comprising first and second members adapted for relative movement such that said first member is selectively moveable along an axis for controllably extending and retracting said first member with respect to said second member within first and second regimes, said first regime allowing free extension of said first member relative to said second member while locking said first member against retraction and said second regime allowing said first member to be reversibly extended and retracted, a coupling mechanism for enabling said regimes, the coupling mechanism comprising:

a bistable element capable of at least two configurations in which the element is stable at rest and is not biased or otherwise tending to another configuration and an engaging member disposed about the axis of motion of said first member and cooperatively constructed such that the bistable element in one configuration enables the first regime by positioning the engaging member to prevent retraction of first member but enable free extension of the first member, and in another configuration, said bistable element enables said second regime by positioning said engaging member such that said first member is freely retractable and extendable, and a regime control for switching between said first and said second regimes by changing the configuration of said bistable member.

2. The device of claim 1 further wherein said coupling mechanism includes a cam surface disposed about and transverse to said axis of motion and wherein said bistable element enables said first regime by positioning said engaging piece adjacent said cam surface and first member such that said engaging piece frictionally bears upon said cam surface and first member to prevent retraction of said first member but enables free continuous extension of said first member, and in another configuration, said bistable element enables said second regime by positioning said engaging piece relative to said cam surface such that said first member is freely retractable and extendable.

3. The device of claim 2 wherein said bistable member comprises an invertable member having mirror-image stable configurations.

4. The device of claim 1 or 3 wherein said bistable element is an annular spring-washer element having inverted conical stable configurations.

5. The device of claim 4 wherein an outer radial edge portion of said bistable element is axially stationary and an inner radial edge portion is axially translated with respect to one of said first and second members, when switching between configurations.

6. The device of claim 5 wherein said engaging member is a spherical element.

7. The device of claim 6 wherein said engaging member is a spherical element and said device includes a plurality of said spherical elements disposed around said axis and a retaining member also disposed around said axis for maintaining the circumferential separation of said spherical elements.

8. The device of claim 1 wherein said regime control comprises a switching element associated with said first member, said switching element positioned about the axis of motion to cause automatic switching of said bistable member between stable configurations at a selected desired point of retraction and at a desired point of extension of said first member.

9. The device of claim 8 wherein said switching element includes a first tab positioned on said first member to apply a force to said bistable element to enable said first regime at maximum retraction of said first member, and a second tab positioned on said first member to apply a force to said bistable element to enable said second regime at a maximum extension of said first member.

10. The device of claim 2 wherein said first member is a shaft member and said second member is a housing adapted to receive an upper portion of said shaft member.

11. The device of claim 10 wherein said upper portion of said shaft member includes a taper to smaller cross-sectional dimension in the direction of lower portions.

12. The device of claim 11 wherein said taper is such that a clearance is maintained between said shaft and lower portions of said housing member when said shaft member is positioned off-axis with respect to said housing member at the maximum angle permitted by the dimension and orientation of said engaging member and cam surface.

13. The device of claims 1 including a spring, biasing said first member to extended positions and wherein said device is constructed such that the bias force of the spring is greater than the force needed to switch said bistable element from one to another stable configuration.

14. The device of claim 13 wherein said device is constructed such that the weight of said article is sufficient to overcome the bias force of the spring and the force needed to switch the bistable element.

15. The device of claim 1 wherein said moveable shaft includes a base at one end for contacting an uneven surface and said housing constructed for mounting in the leg of said furniture.

16. The device of claim 1 constructed as a free standing unit which can be placed underneath said furniture.

17. The device of claim 16 wherein said device is free-standing, without permanent attachment to said furniture, and said housing adapted includes a portion for interposing between said furniture and said uneven surface and said shaft is an adjustable leg member including a base at one end for contacting said surface.

18. The device of claim 7 wherein said engaging piece is a spherical element and said device includes a plurality of said engaging pieces disposed around said axis and a retaining member also disposed around said axis for maintaining the circumferential separation of said engaging pieces said bistable element and retainer member comprise a single molded piece.

19. A device for stabilizing an article on a surface, comprising:

a supporting unit comprising a first member in the form of a moveable shaft and a second member in the form of a housing for receiving said shaft, said shaft being moveable along an axis for controllably extending and retracting said first member with respect to said second member within first and second regimes, said first regime allowing free extension of said first member relative to said second member while locking said first member against retraction and said second regime allowing said first member to be reversibly, freely extended and retracted, a coupling mechanism for automatically enabling said regimes, the coupling mechanism comprising:

an invertable bistable element associated with said second member, which comprises an annular invertable spring wherein outer radial edge portions of said spring are axially stationary and inner radial edge portions are axially translated in use, a rotatable engaging piece disposed about the axis of motion of said first member, and a cam surface disposed about and transverse to said axis of motion, wherein said bistable element enables said first regime by positioning said engaging piece adjacent said cam surface and first member such that said engaging piece frictionally bears upon said cam surface and first member to prevent retraction of said first member but enables free, continuous extension of said first member, and in another, inverted configuration, said bistable element enables said second regime by positioning said engaging piece relative to said cam surface such that said first member is freely retractable and extendable, a regime control associated with said first member for controllably and automatically switching between said first and said second regimes by inverting said bistable member at a desired point based on the extension or retraction of said first member, and a spring biasing said first member to extended positions wherein said spring is constructed to have a bias force greater than the force needed to switch said bistable element from one to another stable configuration.

20. The device of claim 19 wherein an upper portion of said shaft member includes a taper to smaller cross-sectional dimension in the direction of lower portions.

21. The device of claim 19 wherein said moveable shaft includes a base at one end for contacting an uneven surface and said housing is constructed for mounting in the leg of said furniture.

22. The device of claim 19 constructed as a free standing unit which can be placed underneath said furniture.

23. The device of claim 22 wherein said device is free-standing, without permanent attachment to said furniture, and said housing adapted includes a portion for interposing between said furniture and said uneven surface and said shaft is an adjustable leg member including a base at one end for contacting said surface.

24. The device of claim 19 wherein said engaging piece is a spherical element and said device includes plurality of said engaging pieces disposed around said axis and retaining member also disposed around said axis for maintaining the circumferential separation of said engaging pieces said bistable element and retainer member comprise a single molded piece.

* * * * *